United States Patent
Knox

(10) Patent No.: US 10,675,999 B2
(45) Date of Patent: Jun. 9, 2020

(54) ACTIVE VIBRATION ISOLATION SYSTEM

(71) Applicant: ClearMotion Acquisition I LLC, Billerica, MA (US)

(72) Inventor: Lawrence D. Knox, Hopkinton, MA (US)

(73) Assignee: ClearMotion Acquisition I LLC, Billerica, MA (US)

(*) Notice: Subject to any disclaimer, the term of this patent is extended or adjusted under 35 U.S.C. 154(b) by 121 days.

(21) Appl. No.: 15/725,733

(22) Filed: Oct. 5, 2017

(65) Prior Publication Data

US 2018/0105082 A1    Apr. 19, 2018

Related U.S. Application Data

(60) Provisional application No. 62/409,020, filed on Oct. 17, 2016, provisional application No. 62/440,579, (Continued)

(51) Int. Cl.
| | | |
|---|---|---|
| *B60N 2/50* | (2006.01) | |
| *B60N 2/38* | (2006.01) | |
| *B60N 2/39* | (2006.01) | |

(52) U.S. Cl.
CPC ............. *B60N 2/501* (2013.01); *B60N 2/38* (2013.01); *B60N 2/39* (2013.01); *B60N 2/502* (2013.01); *B60N 2/505* (2013.01)

(58) Field of Classification Search
CPC . B60N 2/501; B60N 2/38; B60N 2/39; B60N 2/505; B60N 2/502
See application file for complete search history.

(56) References Cited

U.S. PATENT DOCUMENTS 4,589,620 A * 5/1986 Sakamoto ................. A47C 3/30
                                                      248/550
4,640,488 A * 2/1987 Sakamoto ............... B60N 2/502
                                                      108/145
(Continued)

FOREIGN PATENT DOCUMENTS

EP    2 431 218 A1    3/2012
GB    2 313 214 A     11/1997

OTHER PUBLICATIONS

PCT/US2017/055336, Jan. 19, 2018, International Search Report and Writen Opinion.
(Continued)

*Primary Examiner* — Hunter B Lonsberry
*Assistant Examiner* — Luis A Martinez Borrero
(74) *Attorney, Agent, or Firm* — Wolf, Greenfield & Sacks, P.C.

(57) ABSTRACT

An active vibration isolation system for a motor vehicle seat that is adapted to be occupied by a user, includes an active suspension system that supports the seat above a floor of the motor vehicle, where the suspension system comprises at least one actuator that can be controlled to move the seat up and down in the direction of a vertical axis, a first sensor system mounted to the vehicle and that is adapted to sense vehicle height position changes along or parallel to the vertical axis, a second sensor system that is adapted to determine the seat translational position along or parallel to the vertical axis, and a controller that, in response to the first and second sensor systems, is adapted to provide control signals to the active suspension system that cause motions of the seat that are designed to control the height of the user's head or torso as the vehicle undergoes translations along the vertical axis.

24 Claims, 13 Drawing Sheets

Related U.S. Application Data filed on Dec. 30, 2016, provisional application No. 62/477,967, filed on Mar. 28, 2017.

(56) References Cited

U.S. PATENT DOCUMENTS

| | | | | |
|---|---|---|---|---|
| 4,913,482 A * | 4/1990 | Hanai | B60N 2/501 | 248/421 |
| 5,964,455 A * | 10/1999 | Catanzarite | B60N 2/0244 | 267/131 |
| 6,059,253 A * | 5/2000 | Koutsky | B60N 2/501 | 248/550 |
| 6,084,329 A * | 7/2000 | Fujita | F16F 15/03 | 310/90.5 |
| 6,199,820 B1 * | 3/2001 | Ritchie | B60N 2/0224 | 248/421 |
| 6,286,819 B1 * | 9/2001 | Ritchie | B60N 2/501 | 248/550 |
| 6,301,537 B1 * | 10/2001 | Walker | F16H 59/70 | 701/51 |
| 6,340,152 B1 * | 1/2002 | Ritchie | B60N 2/501 | 188/300 |
| 6,371,456 B1 * | 4/2002 | Ritchie | B60N 2/501 | 248/550 |
| 6,616,117 B2 * | 9/2003 | Gryp | B60N 2/501 | 248/421 |
| 7,418,324 B2 * | 8/2008 | Swinbanks | B63B 17/0081 | 248/550 |
| 7,983,813 B2 * | 7/2011 | Ummethala | B60N 2/501 | 267/136 |
| 8,095,268 B2 * | 1/2012 | Parison | B60N 2/501 | 267/140.11 |
| 8,177,300 B2 * | 5/2012 | Moorhouse | B60N 2/505 | 297/344.12 |
| 8,585,004 B1 * | 11/2013 | Roeglin | F16M 11/18 | 248/421 |
| 8,622,362 B2 * | 1/2014 | Keen | B60N 2/501 | 248/421 |
| 8,744,694 B2 * | 6/2014 | Ystueta | B60N 2/0244 | 701/49 |
| 8,844,894 B2 * | 9/2014 | Archambault | B60N 2/508 | 248/588 |
| 8,973,886 B2 * | 3/2015 | Breen | B60N 2/501 | 248/584 |
| 9,199,563 B2 * | 12/2015 | Howard | B60N 2/501 | |
| 9,291,300 B2 * | 3/2016 | Parker | F16M 13/02 | |
| 9,610,862 B2 * | 4/2017 | Bonk | B60N 2/0252 | |
| 9,682,642 B2 * | 6/2017 | Fujita | B60N 2/501 | |
| 10,112,512 B2 * | 10/2018 | Lorey | B60N 2/502 | |
| 2005/0001493 A1 * | 1/2005 | Jajtic | H02K 29/08 | 310/68 R |
| 2005/0073184 A1 * | 4/2005 | Tsuji | B60N 2/501 | 297/284.1 |
| 2006/0095180 A1 * | 5/2006 | Ummethala | B60N 2/501 | 701/37 |
| 2006/0200287 A1 * | 9/2006 | Parison | B60N 2/501 | 701/37 |
| 2006/0237885 A1 * | 10/2006 | Paillard | B60N 2/501 | 267/140.15 |
| 2006/0261647 A1 | 11/2006 | Maas et al. | | |
| 2010/0052356 A1 * | 3/2010 | Lewis, II | B60N 2/24 | 296/65.02 |
| 2013/0275006 A1 * | 10/2013 | Ystueta | B60N 2/0244 | 701/49 |
| 2014/0316661 A1 * | 10/2014 | Parker | B60N 2/39 | 701/49 |
| 2017/0129372 A1 * | 5/2017 | Hein | B60N 2/39 | |
| 2017/0129373 A1 * | 5/2017 | Knox | B60N 2/10 | |
| 2017/0203673 A1 * | 7/2017 | Parker | B60N 2/39 | |
| 2019/0315254 A1 * | 10/2019 | Tucker | B60N 2/502 | |

OTHER PUBLICATIONS

International Search Report and Written Opinion for International Application No. PCT/US2017/055336, dated Jan. 19, 2018.

* cited by examiner

ACTIVE VIBRATION ISOLATION SYSTEM

CROSS-REFERENCE TO RELATED APPLICATIONS

This application claims priority to the following applications: Provisional application 62/409,020, filed on Oct. 17, 2016, Provisional application 62/440,579, filed on Dec. 30, 2016, and Provisional application 62/477,967, filed on Mar. 28, 2017. The disclosures of these three applications are incorporated by reference herein in their entireties.

BACKGROUND

This disclosure relates to an active vibration isolation system.

Active vibration isolation systems can be used with motor vehicle seats to counteract rolling and jarring motions of vehicle. Many such systems are too large to be used in passenger cars.

SUMMARY

All examples and features mentioned below can be combined in any technically possible way.

In one aspect, an active vibration isolation system for a motor vehicle seat that is adapted to be occupied by a user, includes an active suspension system that supports the seat above a floor of the motor vehicle, where the suspension system comprises at least one actuator that can be controlled to move the seat up and down in the direction of a vertical axis, a first sensor system mounted to the vehicle and that is adapted to sense vehicle height position changes along or parallel to the vertical axis, a second sensor system that is adapted to determine the seat translational position along or parallel to the vertical axis, and a controller that, in response to the first and second sensor systems, is adapted to provide control signals to the active suspension system that cause motions of the seat that are designed to control the height of the user's head or torso as the vehicle undergoes translations along the vertical axis.

Embodiments may include one of the following features, or any combination thereof. The active suspension system may comprise at least two actuators, where the actuators can be controlled to move the seat up and down in the direction of the vertical axis and rotate the seat in both directions about a horizontal axis. The first sensor system May be further adapted to sense vehicle rotational position changes about or parallel to the horizontal axis. The second sensor system may be further adapted to determine a rotational position of the seat relative to the horizontal axis. The control signals may further cause motions of the seat that are designed to control the lateral position of the user's head or torso as the vehicle undergoes rotations about the horizontal axis. The active vibration isolation system may further comprise a third sensor system that is adapted to determine neutral positions of the seat relative to the horizontal and vertical axes, and wherein the controller is further responsive to the third sensor system. The third sensor system may have an output state and is adapted to change its output state at a mid-height position of the seat relative to the vertical axis. The third sensor system may provide knowledge of whether the seat is above or below the mid-height position. The controller may be further adapted to use the third sensor system to re-calibrate each time the seat moves through either of the neutral positions. The second sensor system may comprise a relative sensor and the third sensor system may comprise a one-bit sensor. The control signals may be adapted to maintain the lateral position of the user's head or torso as the vehicle undergoes rotations about the horizontal axis and translations along the vertical axis.

Embodiments may include one of the following features, or any combination thereof. The first sensor system may be mounted to the vehicle floor. The first sensor system may comprise a vertical axis accelerometer and a horizontal axis roll sensor. The actuators may each comprise a rotary motor and a linear actuator coupled to the motor that converts the rotary motor motion to linear motion. The linear actuators may comprise ball screw assemblies.

In another aspect, an active vibration isolation system for a motor vehicle seat that is adapted to be occupied by a user, includes an active suspension system that supports the seat above a floor of the motor vehicle, where the suspension system comprises a linear actuator that can be controlled to rotate the seat in both directions about a horizontal axis, a first sensor system mounted to the vehicle and that is adapted to sense vehicle rotational position changes about the horizontal axis, a second sensor system that is adapted to determine a rotational position of the seat relative to the horizontal axis, and a controller that, in response to the first and second sensor systems, is adapted to provide control signals to the active suspension system that cause motions of the seat that are designed to control the lateral position of the user's head or torso as the vehicle undergoes rotations about the horizontal axis.

Embodiments may include one of the following features, or any combination thereof. The active vibration isolation system may further comprise a third sensor system that is adapted to determine neutral positions of the seat relative to the horizontal axis, wherein the controller is further responsive to the third sensor system. The third sensor system may have an output state and may be adapted to change its output state at a horizontal mid position of the seat relative to the horizontal axis. The third sensor system may provide knowledge of whether the seat is to the left or right of the seat horizontal mid position. The controller may be further adapted to use the third sensor system to re-calibrate each time the seat moves through the neutral position. The first sensor system may be mounted to the vehicle floor. The linear actuator may comprise a rotary motor and an actuator coupled to the motor that converts the rotary motor motion to linear motion. The actuator may comprise a ball screw assembly.

In another aspect, an active vibration isolation system for a motor vehicle seat that is adapted to be occupied by a user, includes an active suspension system that supports the seat above a floor of the motor vehicle, where the suspension system comprises at least two linear actuators that can be controlled to move the seat up and down in the direction of a vertical axis and rotate the seat in both directions about a horizontal axis, a first sensor system mounted to the vehicle and that is adapted to sense vehicle rotational position changes about the horizontal axis and vehicle height position changes along the vertical axis, a second sensor system that is adapted to determine a rotational position of the seat relative to the horizontal axis and the seat translational position along the vertical axis, and a controller that, in response to the first and second sensor systems, is adapted to provide control signals to the active suspension system that cause motions of the seat that are designed to control the lateral position and the height of the user's head or torso as the vehicle undergoes rotations about the horizontal axis and translations along the vertical axis.

Embodiments may include one of the following features, or any combination thereof. The active vibration isolation system may further comprise a third sensor system that is adapted to determine neutral positions of the seat relative to the horizontal and vertical axes, wherein the controller is further responsive to the third sensor system. The third sensor system may have an output state and is adapted to change its output state at a horizontal mid-position of the seat relative to the horizontal axis, and a mid-height position relative to the vertical axis. The third sensor system may provide knowledge of whether the seat is above or below the mid height position, and whether the seat is to the left or right of the seat horizontal mid position. The controller may be further adapted to use the third sensor system to re-calibrate each time the seat moves through either of the neutral positions. The first sensor system may be mounted to vehicle floor. The linear actuators may each comprise a rotary motor and an actuator coupled to the motor that converts the rotary motor motion to linear motion.

In another aspect, an active vibration isolation system for a motor vehicle seat that is adapted to be occupied by a user, includes an active suspension system that supports the seat above a floor of the motor vehicle, where the suspension system comprises at least two linear actuators that can be controlled to move the seat up and down in the direction of a vertical axis and rotate the seat in both directions about a horizontal axis, a passive isolation stage positioned between the vehicle seat and the active suspension system, the isolation stage configured to permit relative motion of the seat and the active suspension system in a direction parallel to the horizontal axis, a first sensor system mounted to the vehicle and that is adapted to sense vehicle rotational position changes about the horizontal axis and vehicle height position changes along the vertical axis, a second sensor system that is adapted to determine a rotational position of the seat relative to the horizontal axis and the seat translational position along the vertical axis, and a controller that, in response to the first and second sensor systems, is adapted to provide control signals to the active suspension system that cause motions of the seat that are designed to control the lateral position and the height of the user's head or torso as the vehicle undergoes rotations about the horizontal axis and translations along the vertical axis.

Embodiments may include one of the following features, or any combination thereof. The passive isolation stage may comprise a damper assembly to provide a damping force to mitigate at least one of oscillatory movement of the seat in the horizontal direction and excessive movement of the seat in the horizontal direction. The passive isolation stage may comprise a locking assembly to lock the position of the seat in the horizontal direction.

DETAILED DESCRIPTION

An active vibration isolation system can be used to maintain the height of a seat base constant in space as the vehicle moves up and down and rolls, and also can be used to maintain the user's torso or head in a constant lateral position as the vehicle moves up and down and rolls. These motions can be accomplished, within system limits, independently of the user's weight. Further, the system open-loop transfer function is largely independent of the weight carried by the seat, leading to a simple and robust controller design.

Figure 1:
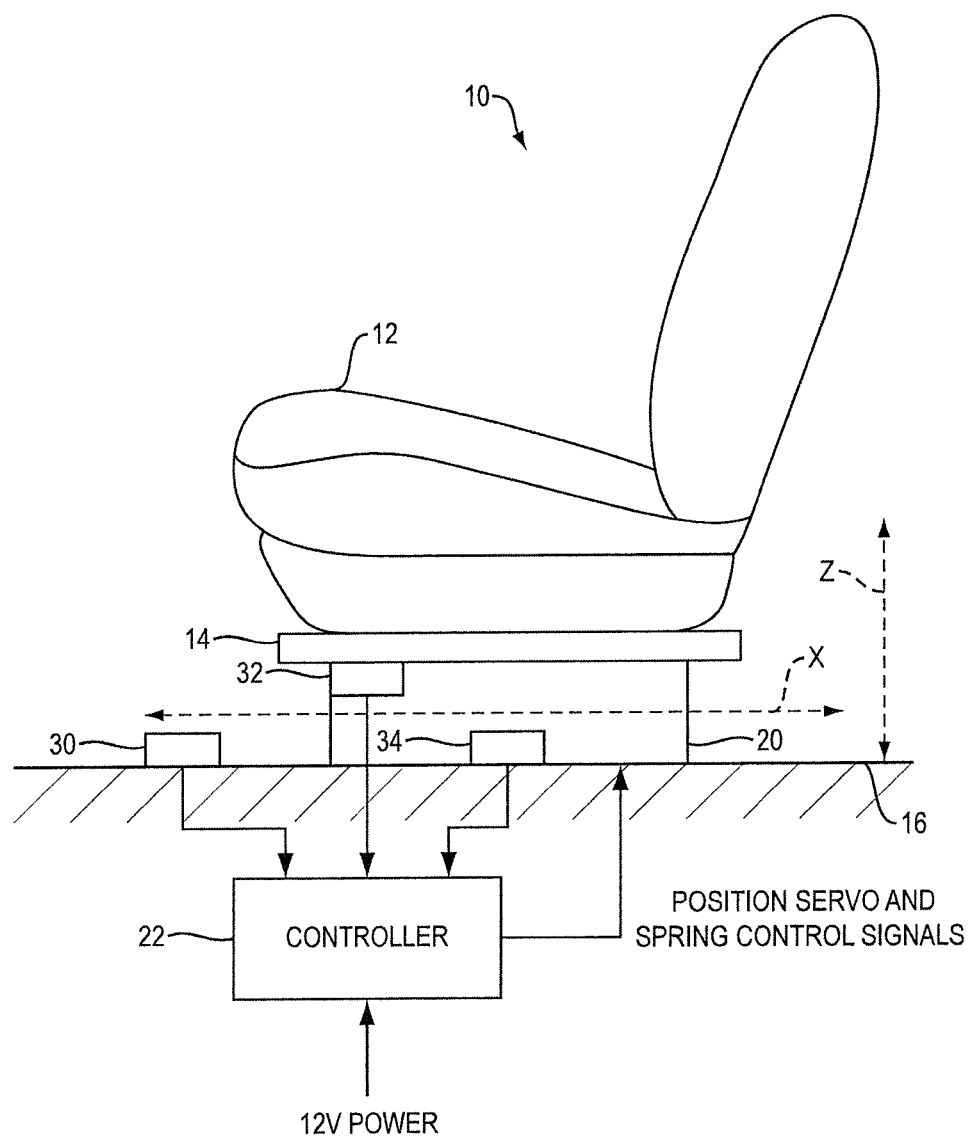
FIG. 1 is schematic diagram of an active vibration isolation system used for a seat of a motor vehicle.

Active vibration isolation system 10, FIG. 1, is adapted to control motions of vehicle seat 12 (via seat base 14 that supports seat 12) relative to vehicle floor 16. Active suspension system 20 supports seat base 14 above floor 16. Active suspension system 20 is adapted to move seat base 14 up and down in the direction of vertical axis Z. Active suspension system 20 is also adapted to rotate seat base 14 in both directions (left and right) about horizontal, forward-facing axis X.

Active vibration isolation system 10 can in one non-limiting example be operated with the aim of maintaining the lateral (side-to-side) position of the upper torso/head of a person sitting in seat 12 while the vehicle undergoes rotations about a forward vehicle axis that is parallel to or coincident with axis X (such rotations also known as vehicle "roll"). This user lateral position control is further described in U.S. Patent Application Publication 2014/0316661, entitled "Seat System for a Vehicle," the disclosure of which is incorporated herein by reference. Accordingly, the goals of such user lateral position control will not be further described herein. System 10 can be operated in other manners (with other control algorithms). For example, system 10 can be operated to move the occupant (via the seat), or to move the seat per se, in other prescribed (pre-calculated) manners.

Active suspension system 20 is also adapted to translate seat base 14 up and down parallel to the vertical (Z) axis. Active vibration isolation system 10 can in one non-limiting example be operated with the aim of maintaining seat base 14 (and thus seat 12 and a person sitting in seat 12) at a constant height in space while vehicle floor 16 moves up and down as the vehicle travels over a surface. As described above relative to lateral positioning, seat translations can be designed to achieve other motions or other goals.

System 10 includes a sensor 30 (which may comprise one or more physical sensing devices) mounted to the vehicle (in this non-limiting example, mounted to vehicle floor 16). Sensor 30 is preferably an absolute sensor that, alone or in conjunction with operations performed by controller 22, senses vehicle rotational position changes about axis X (or, an axis parallel to axis X), and vehicle height position changes along (or parallel to) axis Z. System 10 also includes seat position sensor 32 (which may comprise one or more physical sensing devices) that is preferably a relative sensor that, alone or in conjunction with controller 22, determines the seat roll position relative to the vehicle about axis X (or, an axis parallel to axis X), and the seat translational position relative to the vehicle along (or parallel to) axis Z. System 10 may also include optional seat neutral position sensor 34 (which may comprise one or more physical sensing devices) that is preferably a relative sensor that, alone or in conjunction with controller 22, determines "neutral" seat Z axis and roll positions. Neutral position sensor 34 can be enabled to change its output state at the mid positions of the seat in roll and Z. Accordingly, it can also provide knowledge of whether the seat is above or below the mid height position, and whether the seat is to the left or right of the seat horizontal (i.e., roll neutral) position. Neutral position sensor 34 can also be used to re-calibrate system 10 each time the seat moves through either of these neutral positions, as is further explained below. In cases where system 10 includes sensors 30 and 32 but not sensor 34, sensor 32 could be an absolute calibrated sensor so that it can be used to report the actual seat position, which also provides information concerning the seat position relative to the height and roll neutral positions.

Controller 22 receives the outputs of sensors 30 and 32 (and the output of sensor 34 when sensor 34 is used) and in response provides appropriate control signals to active suspension system 20 so as to achieve the results of the particular active seat position control algorithms that are designed into system 10. Non-limiting examples of the goals of such algorithms are described above. One specific non-limiting example is to maintain (as best as possible) the user's head/torso lateral position and the user's Z position as the vehicle undergoes rotations about axis X and translations along axis Z. Power for the controller and the active suspension system is typically provided via the motor vehicle electrical system, commonly at 12V, with appropriate conditioning and the like to meet the requirements of system 10.

Figure 2:
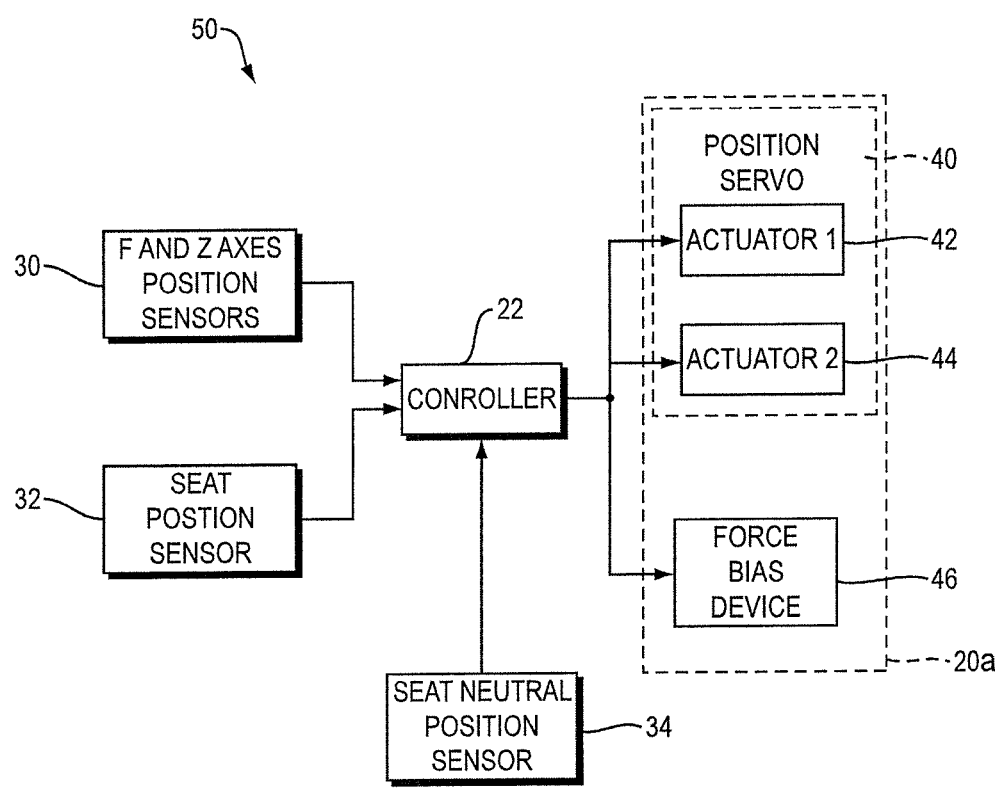
FIG. 2 is a functional block diagram of one example of the system of FIG. 1.

A functional block diagram of an active vibration isolation system 50 is depicted in FIG. 2. System 50 differs from system 10, FIG. 1, in that active suspension system 20a in this case includes seat position servo 40 and force bias device 46. A force bias device is a passive suspension device such as a spring, but with an adjustable spring force. One goal of the force bias device is to support the seat and user in a nominal neutral position while the vehicle is at rest, so that the active suspension does not need to be engaged at all times, which saves vehicle power. This also saves vehicle power when the active suspension is operated, as much of the weight is supported by the force bias device so that the actuators do not need to produce as much force. Force bias devices for active motor vehicle seat control are known in the art, and are further described in U.S. Pat. No. 8,095,268, issued on Jan. 10, 2012, the disclosure of which is incorporated herein by reference. Accordingly, the functions of force bias device 46 will not be further described herein. Seat position servo 40 may be a high bandwidth position servo that is adapted to control the roll and Z axis positions of the seat. Servo 40 is able to create (within limits) whatever force is necessary to maintain the desired seat positions. In this example, position servo 40 includes two actuators; actuator 1 (42) and actuator 2 (44). Actuators 42 and 44 can be of any design and construction that is capable of moving the seat in the directions necessary to achieve the motion results of the control algorithms. In this non-limiting example the actuators are linear actuators, but the actuators could alternatively be rotary actuators, for example.

Figure 3:
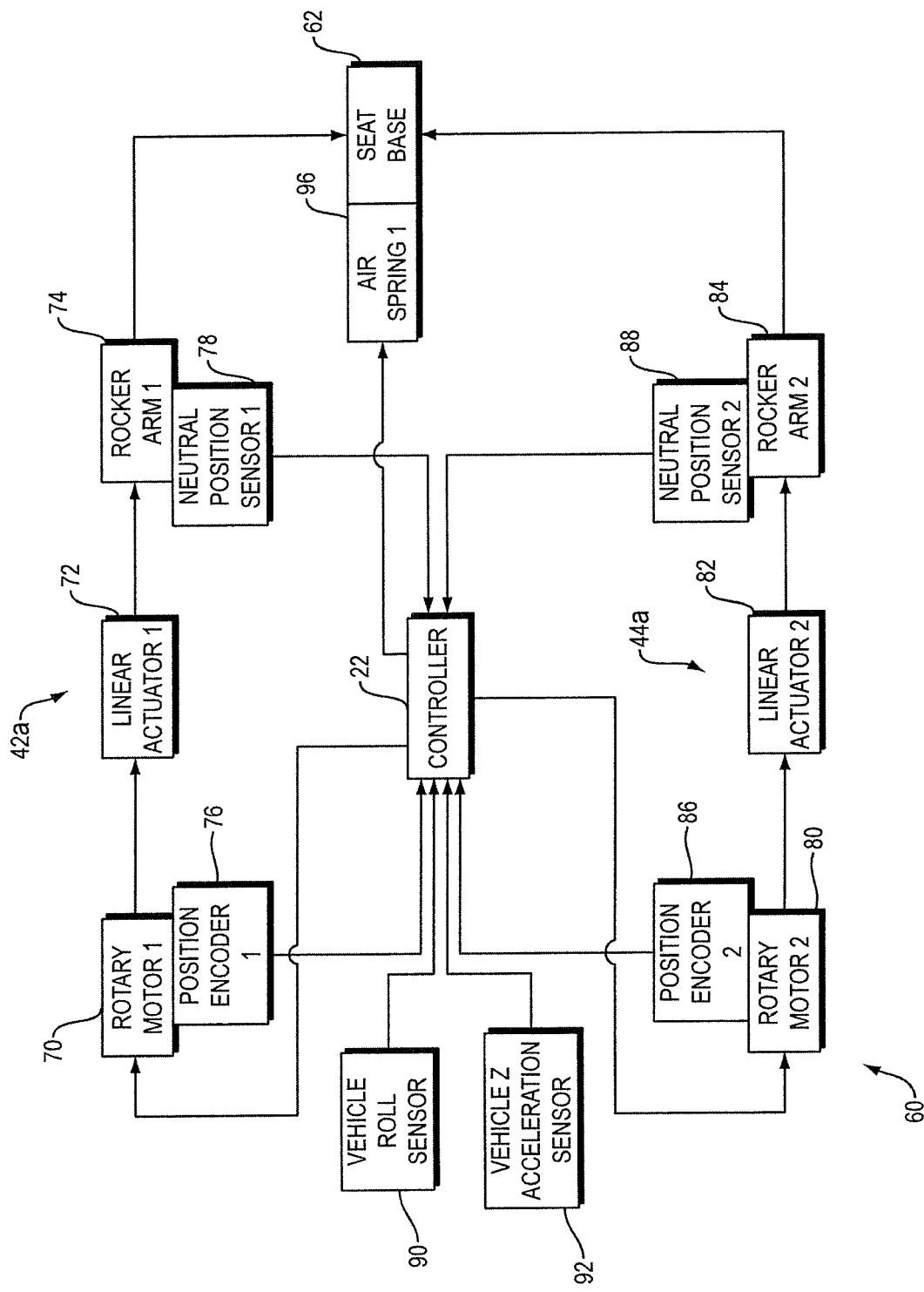
FIG. 3 is a more detailed functional block diagram of another example of the system of FIG. 1.

A more detailed block diagram of an active vibration isolation system 60 is shown in FIG. 3. Actuators 42a and 44a in this non-limiting example each comprise a rotary motor (70, 80) that drives a linear actuator (72, 82) which in turn moves a rocker arm (74, 84) that is directly or indirectly mechanically coupled to seat base 62. The use of two separately controlled actuators allows control of both the vertical and roll positions of the seat base, and thus the seat and the person sitting in the seat. This is further described below.

Position encoders 76 and 86 are relative sensors that measure the rotational positions of motors 70 and 80, respectively. Controller 22 is programmed to calculate from the encoder data the seat position relative to the vehicle in both Z and roll. Neutral position sensors 78 and 88 (when used) are preferably one-bit Hall sensors at top dead center (neutral position) of each of the rocker arms. Sensors 78 and 88 accordingly produce output signals each time the respective rocker arm moves through the neutral position; these data can be used to help determine which direction(s) to move the seat, and also to calibrate the system on the fly so as to maintain the accuracy of the seat position calculations in both Z and roll. FIG. 3 also illustrates the preferred use of an air spring 96 as the force bias device; an air spring also uses a pressure source and a valve (not shown). An alternative would be to use one or more torsion springs, as further described below, or other springs with adjustable spring forces. More than one force bias device could be used, and more than one type could be used (e.g., an air spring and one or more torsion springs).

Controller 22 receives signals from vehicle roll sensor (which may be a rate gyroscope) 90, vehicle Z axis accelerometer 92, position encoders 76 and 86, and neutral position sensors 78 and 88. The gyro input is integrated, and the accelerometer input is double integrated, to obtain the rotational and vertical displacement signals. Controller 22 outputs in response to all of its inputs, control signals for rotary motors 70 and 80, and control signals to the valve for air spring 96. These control signals are designed to achieve user position control as prescribed by the appropriate control algorithm. In one example control algorithm described above, the lateral and vertical positions of the user are maintained. To accomplish this, seat base 62 is moved so as to, in limit, maintain its z position in space as the vehicle moves up and down and rolls, and seat base 62 is also moved so as to, in limit, maintain the user's torso or head in a constant lateral position as the vehicle moves up and down and rolls about the forward vehicle axis parallel to or coincident with the X axis. Different seat base motions could be commanded so as to accomplish other control algorithms.

Within limits, system 60 accomplishes these motions independent of the user's weight. System 60 is able to maintain the static seat height independently of the user's weight because the spring (e.g., the air spring or the torsion bar spring) is able to provide a spring force to match the user's weight. Also, the operation of system 60 is largely independent of the spring rate and the natural frequency of the user on the seat. In contrast, known systems such as that described in U.S. Patent Application Publication No. 2006/0261647 attempt to preserve a natural frequency of the user on the seat, regardless of the user's weight, by using a progressive spring-rate spring. The heavier the user the further the spring is compressed in order to reach a section of the spring with a greater spring rate. Accordingly, the static compression of the spring is dependent on the user's weight, and so the static seat height is also dependent on user weight.

The operation of controller 22 is also largely independent of the user's weight. System 60 uses position sources rather than the force sources that are used in the system described in U.S. Patent Application Publication No. 2006/0261647. With a force source the user's weight is a large contributor to the system dynamics: as the actuator motion ratio increases, the moving mass of the actuator itself becomes of greater significance in determining the system dynamics while the mass of the user becomes of lesser significance to the system dynamics. In contrast, in present system 60 where position sources are used rather than force sensors, the motion of the actuator is largely independent of the payload (either the weight of the user or the moving mass of the actuator) and only commands to the controller. This leads to a simpler, more robust controller design in system 60.

System 60 is also adapted to manage the end of range of travel regions so as to minimize jarring motions that might occur when the vehicle experiences excursions that would result in greater roll or z axis motion than the system is able to accomplish. For example, if the vehicle is driven over a deep pothole at relatively high speed the vehicle floor will move down quickly and substantially. System 60 will extend the seat suspension upward, with the goal of maintaining the seat at a constant height in space. However, the upward travel is inherently limited by the construction of the seat suspension. The same applies for downward travel, and the left and right roll limits. In order to soften any jarring that might occur if the seat is moved quickly to its end of travel range (in the Z and/or X axes), controller 22 may be adapted to "harden" or "stiffen" the seat suspension as end of travel range is approached. Such stiffening could be progressive, so as to prevent the seat from ever reaching the end of travel range. Or, the system could allow the end of travel range to be met, but in a manner that slows the seat velocity as the end of range is approached. Since system 60 uses a position servo rather than a force source, such stiffening could be accomplished by reducing the amount of seat translation per vehicle displacement (as determined from the accelerometer signals).

Details of one non-limiting example of active suspension system 20b for the active vibration isolation system are shown in FIGS. 4-7. Actuators 42a and 44a are held in place by box-shaped support frame 91 that comprises front 97, rear 98 and sides 99 and 103. Actuators 42a and 44a are linear actuators. Linear actuators could be accomplished in any desired manner, such as with linear motors, or, as described below, with rotary motors that drive rotary to linear converters. Rotary to linear converters are known in the art, and may comprise, for example, ball screw assemblies, lead screws or worm gears.

Actuator 42a comprises rotary motor 70 with its output coupled to ball screw assembly 72a that converts input rotary motion to output linear motion. The coupling of the motor to the ball screw assembly (not shown) can be accomplished using a cogged belt or v-belt or chain, or any other such coupling as would be known in the art such as a gear train or direct coupling; this coupling is protected by guard 85. Ball screw assembly 72a output shaft 113 is coupled to rocker arm 74a. The other end of the ball screw assembly is fixed to frame 91. Rocker arm 74a comprises link 100 (with rotational axis 101) that is fixed to bar 102 (with rotational axis 180). Links 104 and 106 are fixed to and extend from bar 102, and have distal ends 105 and 107. As explained below, the seat is (indirectly) coupled to ends 105 and 107. Rocker arm 74a translates linear input motion to rotational output motion.

Actuator 44a comprises rotary motor 80 with its output coupled to ball screw assembly 82a that converts input rotary motion to output linear motion. The coupling of the motor to the ball screw assembly can be accomplished using a cogged belt or v-belt or chain, or any other such coupling as would be known in the art such as a gear train or direct coupling; this coupling is protected by guard 83. Ball screw assembly 82a output shaft 109 is coupled to rocker arm 84a. The other end of the ball screw assembly is fixed to frame 91. Rocker arm 84a comprises link 110 (with rotational axis 111) that is fixed to bar 112 (with rotational axis 182). Links 114 and 116 are fixed to and extend from bar 112. Pivoting links 118 and 120 are pivotally coupled to the ends of links 114 and 116, and are adapted to rotate about axis 130. As explained below, the seat is (indirectly) coupled to ends 119 and 121 of links 118 and 120, along axis 123. Rocker arm 84a translates linear input motion to rotational output motion.

Figure 8:
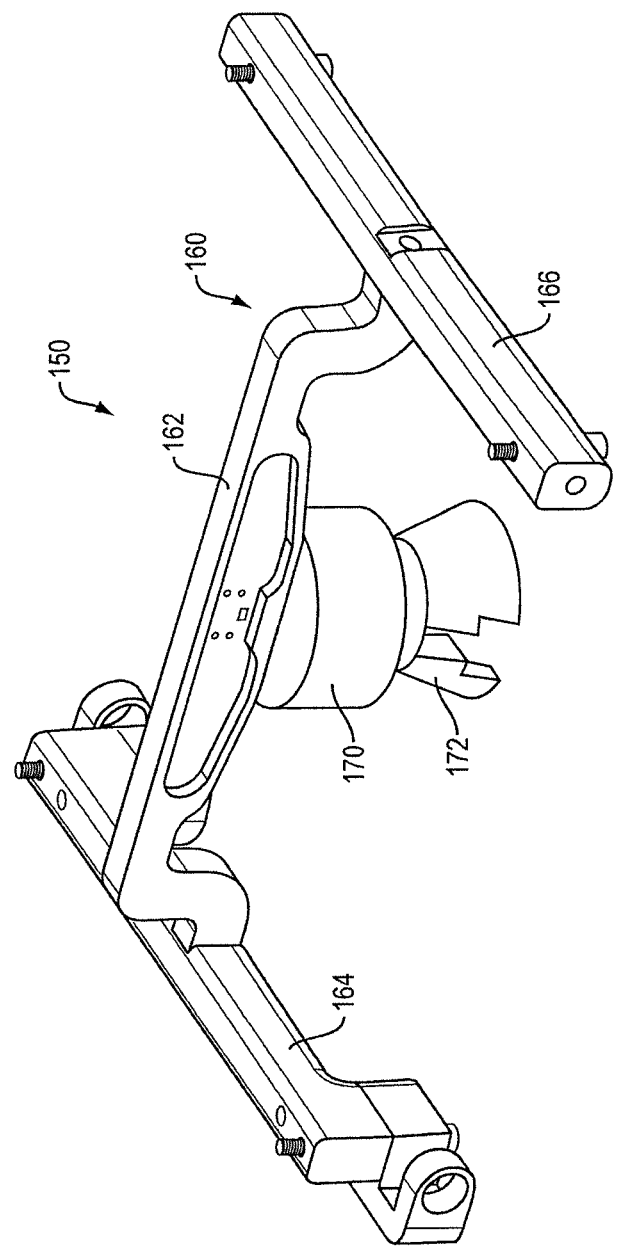
FIG. 8 is a top perspective view of a seat support/air spring assembly for an active vibration isolation system.
Figure 9:
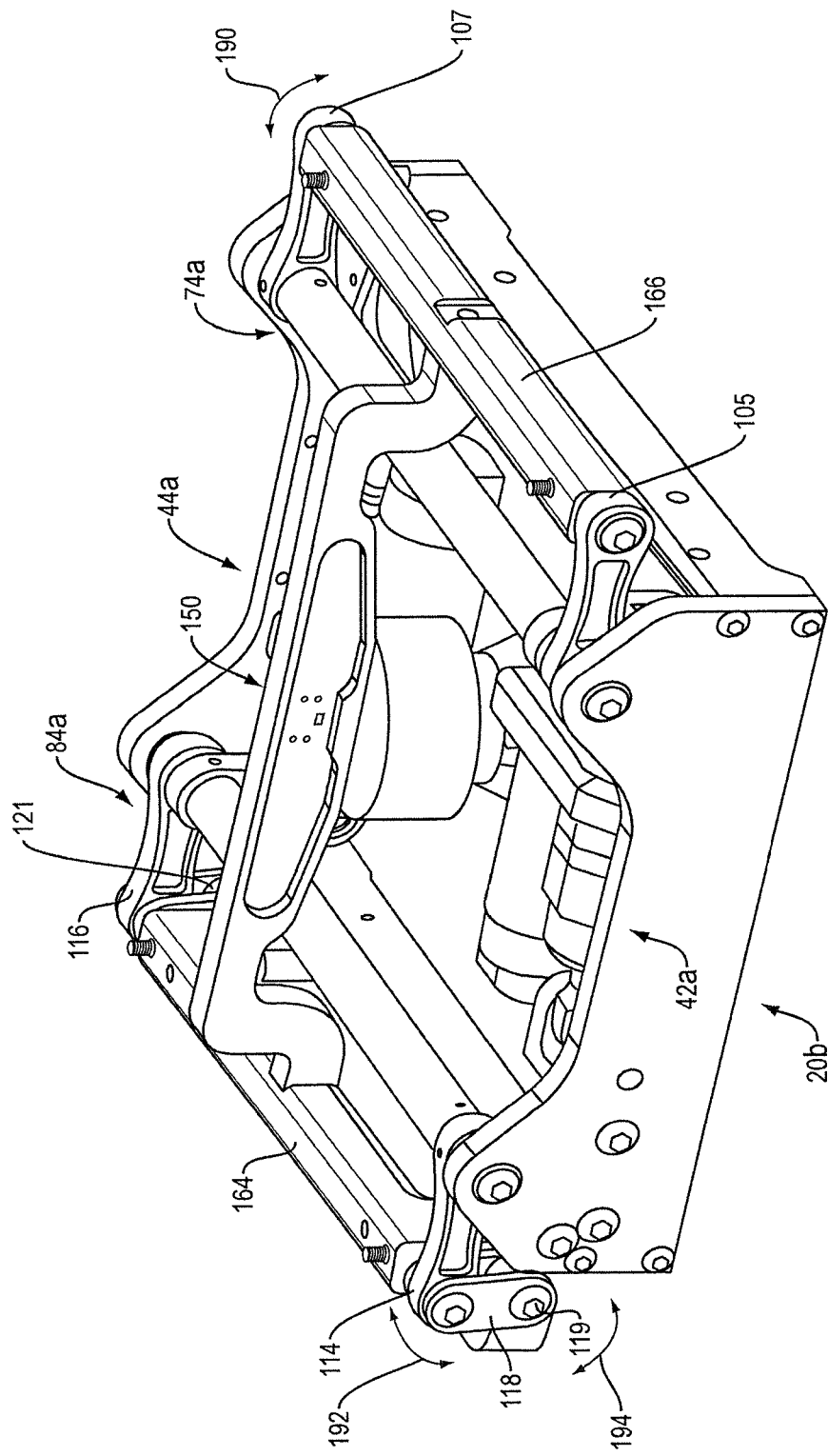
FIG. 9 shows the seat support/air spring assembly of FIG. 8 mounted to the active suspension system of FIG. 4.

Seat support/air spring assembly 150 is shown by itself in FIG. 8, and is shown mounted to active suspension system 20b in FIG. 9. Assembly 150 comprises rigid mechanical seat support 160 that itself comprises central member 162 and seat supporting cross members 164 and 166. Air spring 170 is coupled to the bottom of member 162, and is supported on the vehicle floor (not shown) by load spreader 172. As shown in FIG. 9, member 166 is coupled to link ends 105 and 107 such that when rocker arm 74a is rotated, member 166 moves along arc 190. Member 164 is coupled to link ends 119 and 121. When rocker arm 84a is rotated, links 116 and 118 are moved along arc 192. Link ends 119 and 121 are able to rotate about arc 194. Pivoting links 118 and 120 are needed to translate the arcuate motions of the ends of the rocker arm to vertical motion of the seat.

Figure 10:
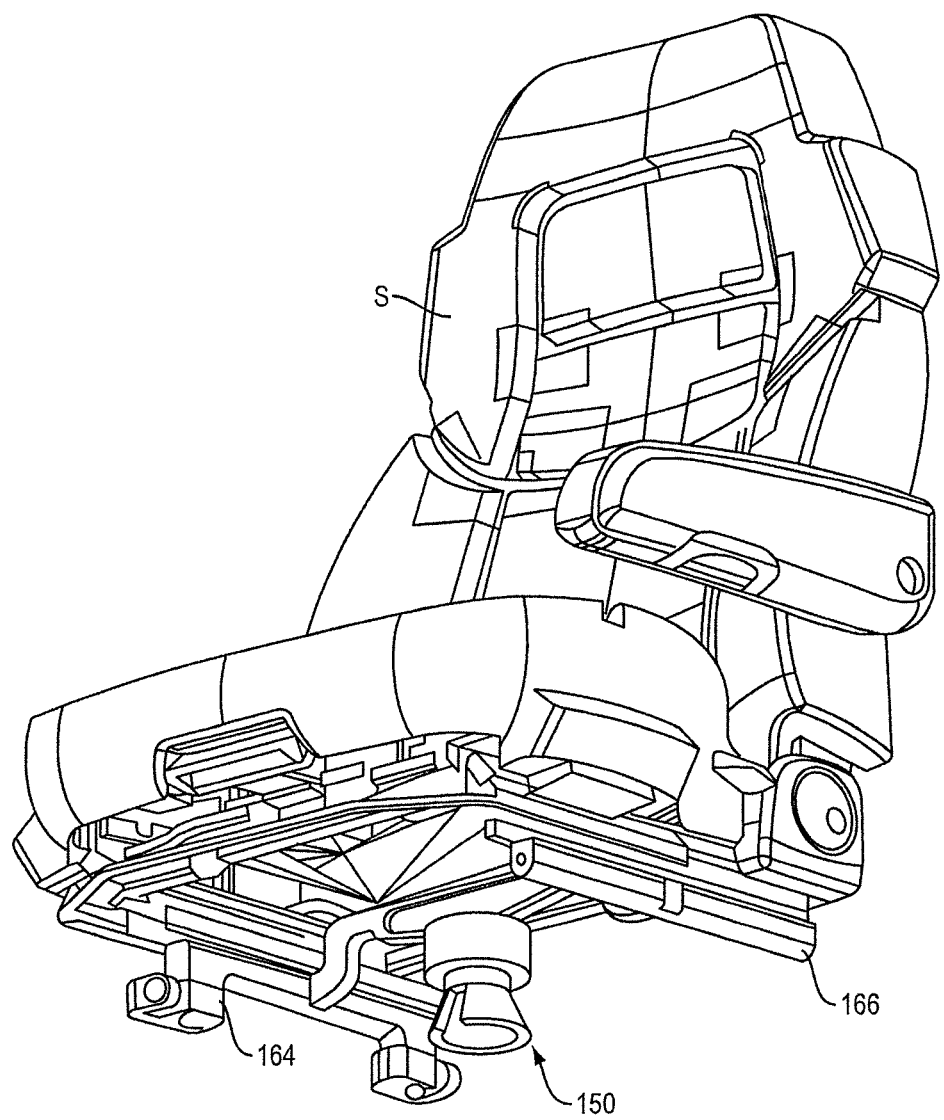
FIG. 10 is a bottom perspective view of the seat support/air spring assembly of FIG. 8 mounted to a seat.

FIG. 10 shows seat support/air spring assembly 150 mounted to the bottom of seat S. Since members 164 and 166 can be independently moved up or down by active suspension system 20b, the seat is able to pivot both ways about axis X and translate up and down along axis Z (FIG. 1). For example, when both actuators are extended the seat moves up, and when one is extended and one retracted the seat rolls. If only one is extended the seat motion is partially translational and partially a roll. Thus, the active vibration isolation system is able to move the seat so as to maintain the user's head/torso in a fixed translational (side-to-side) position and maintain the seat (and thus the user's head) at a constant height in space (both, to limits) while the motor vehicle rolls and translates up and down.

In one embodiment the force bias device is accomplished partially or completely with one or more torsion springs. A torsion spring can be accomplished with a torsion bar, which can be mounted within bar 102 and/or bar 112. Such torsion bars would act on the seat through the ends of the rocker arms. The force provided by a torsion spring can be adjusted by changing the degree of twist imparted to the spring.

When rotary motors and ball screw assemblies are used in combination as linear actuators, the motors can be small 12V electric motors with high motion ratio such that a small amount of power can produce a small amount of motor output torque, but result in a high force output via the ball screw assembly. The ball screw assemblies can be non-back-drivable devices so that the actuators hold their positions well. One result of this arrangement, and the horizontal orientations of the motors and ball screw assemblies, is that the active suspension system (which is located between the seat and the vehicle floor) has a low profile—perhaps in the range of about 8-10 cm. This lends itself to use of the active vibration isolation system in all kinds of motor vehicles, including vehicles with little headroom such as passenger cars.

Figure 11:
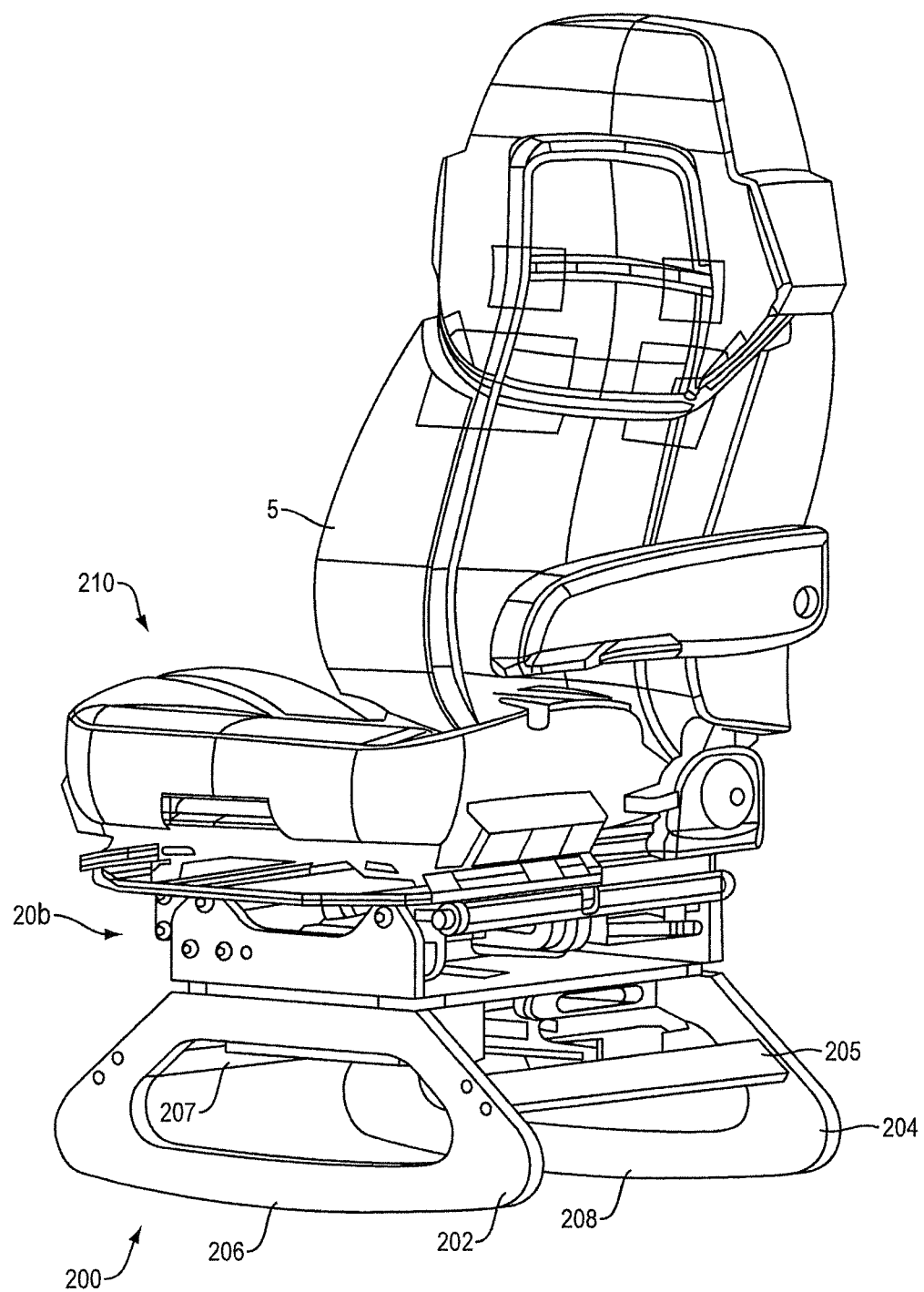
FIG. 11 is a perspective view of a demonstration system for the active vibration isolation system.

FIG. 11 is a perspective view of a demonstration system 210 for the active vibration isolation system. The demonstration system is constructed and arranged to demonstrate the motions that can be accomplished by the active vibration isolation system, such as the system described above. System 210 is in one use situation able to easily replicate vehicle roll, and can demonstrate the responses to roll of active suspension system 20b. Vehicle roll is replicated by the use of rocker platform 200 that is coupled below active suspension system 20b, such that platform 200 rests on the floor. Rocker members 202 and 204 have curved bottom surfaces 206 and 208. Cross-members 205 and 207 help to maintain rigidity. This construction of rocker platform 200 allows the seat S to move side to side, like a sideways rocking chair. Movement can be accomplished in a desired manner, for example by pushing on one side of seat S. If the active suspension system is engaged, it will cause motions of the seat aimed to maintain the lateral position of the user's head or torso as the seat is pushed. In an alternative arrangement the active suspension system can be turned on after the rocking motion has begun, so the user can feel the rocking motion (roll) and then the system's response to the roll. In yet another alternative use situation, active suspension system 20b can be commanded to cause motions of the seat that initiate the side-to-side rocking motion (a "self-actuated mode"). The self-actuated mode can be used as desired, for example to draw attention to the demonstration system in a vehicle showroom or the floor of a trade show. System 210 can be accomplished simply by providing rocker platform 200 and programming the controller to achieve the desired motions. Appropriate power supplies (e.g., 120V to 12V adapters) may also be needed.

Figure 4:
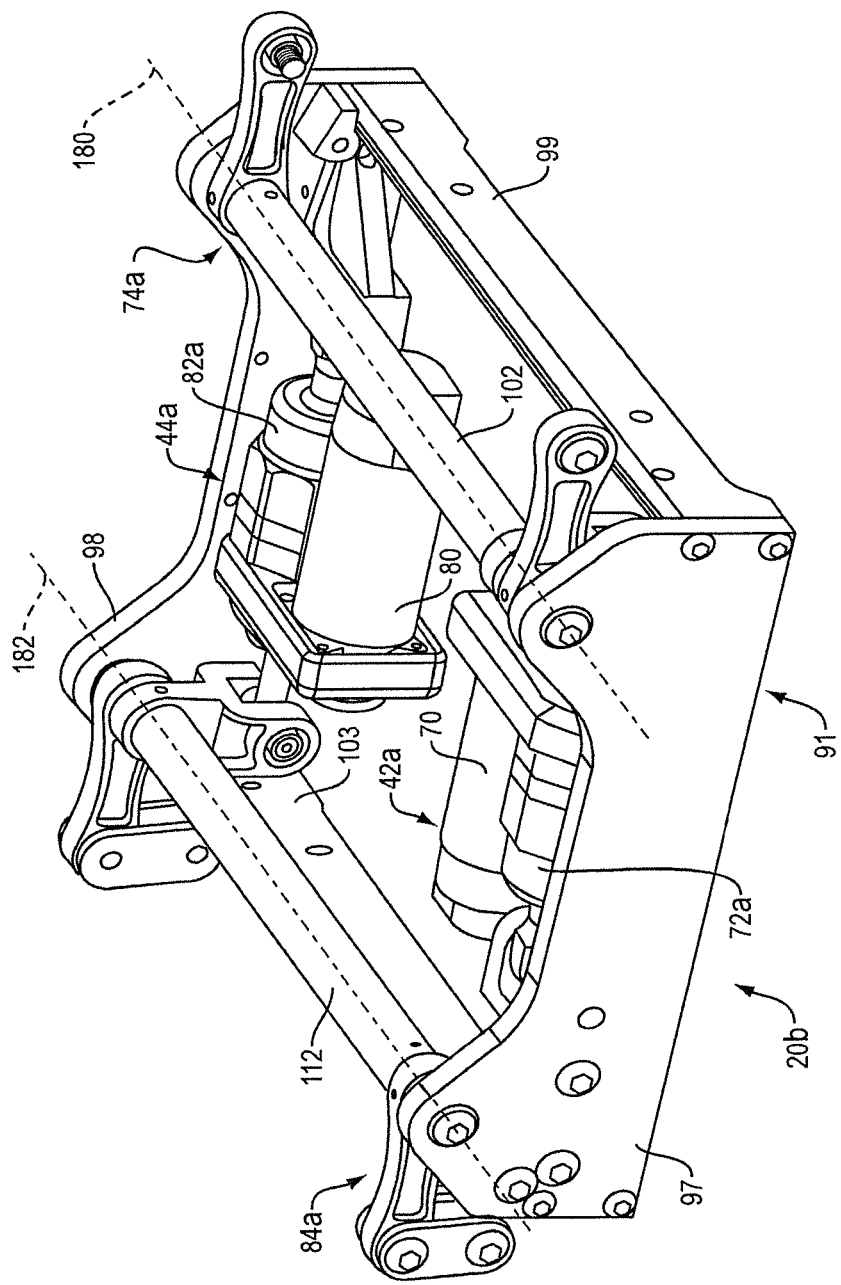
FIG. 4 is a top perspective view of an active suspension system for the active vibration isolation system.
Figure 5:
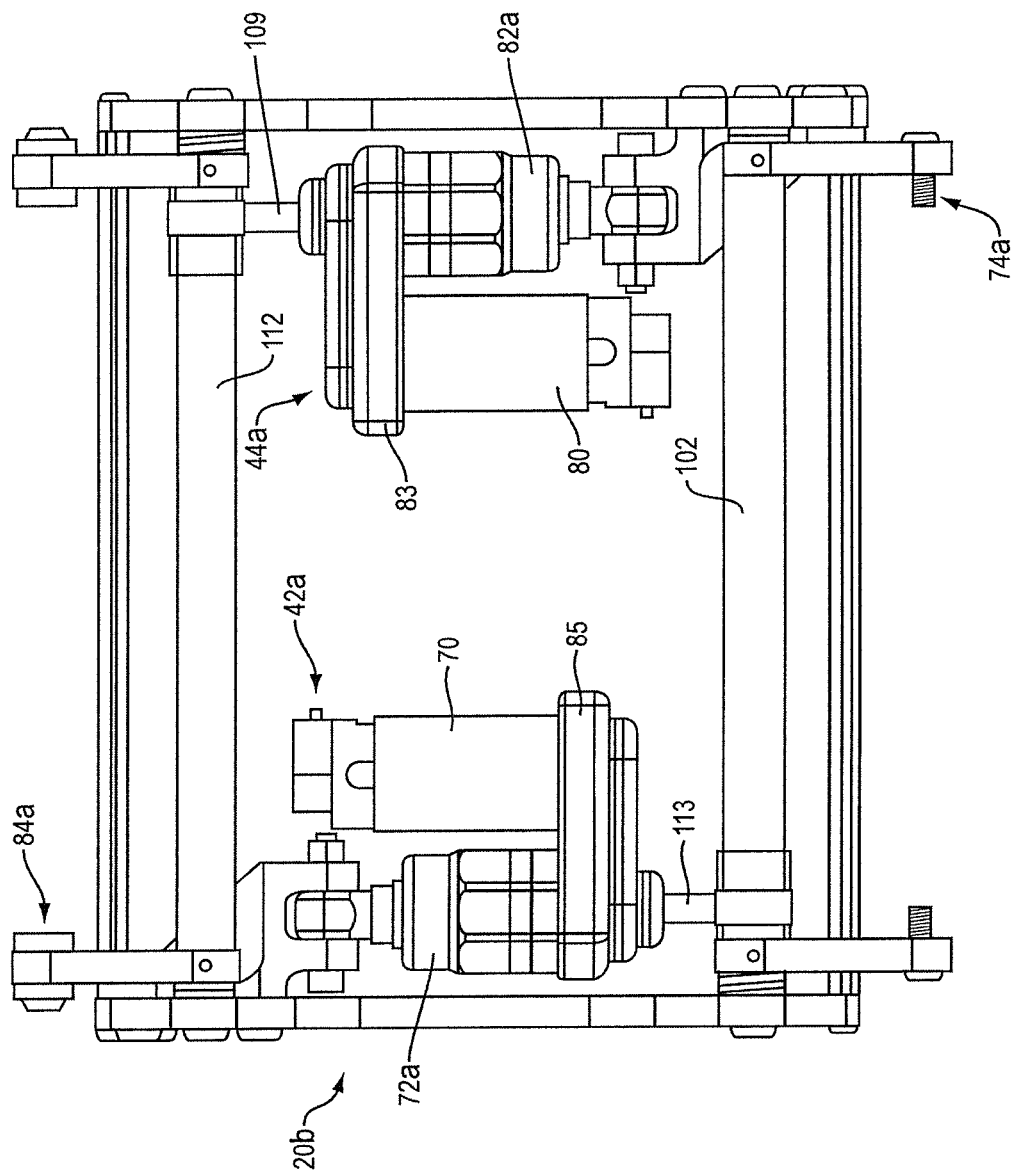
FIG. 5 is a top view of the active suspension system of FIG. 4.
Figure 6:
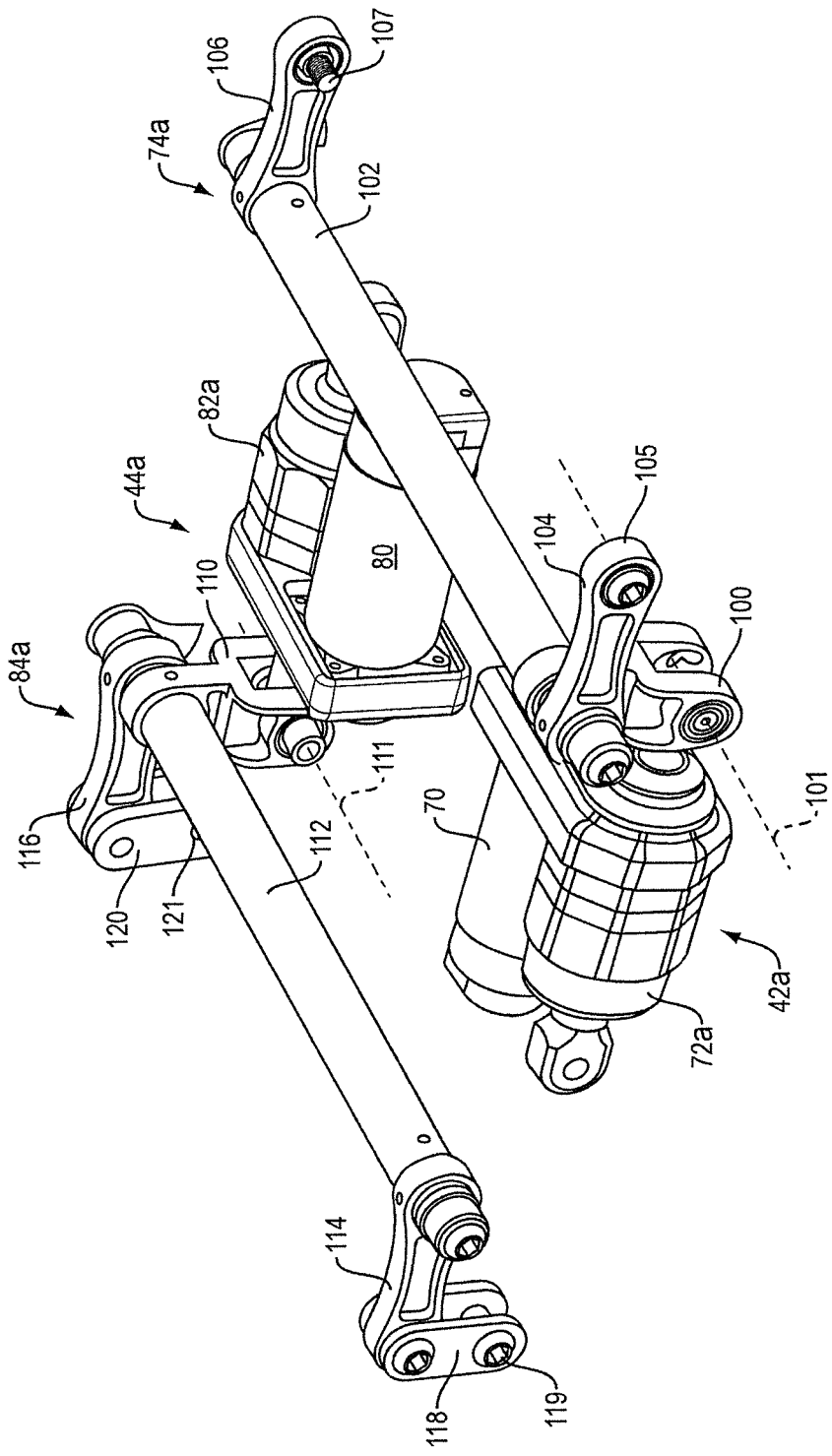
FIG. 6 is a partial view, showing the actuators of the active suspension system of FIG. 4.
Figure 7:
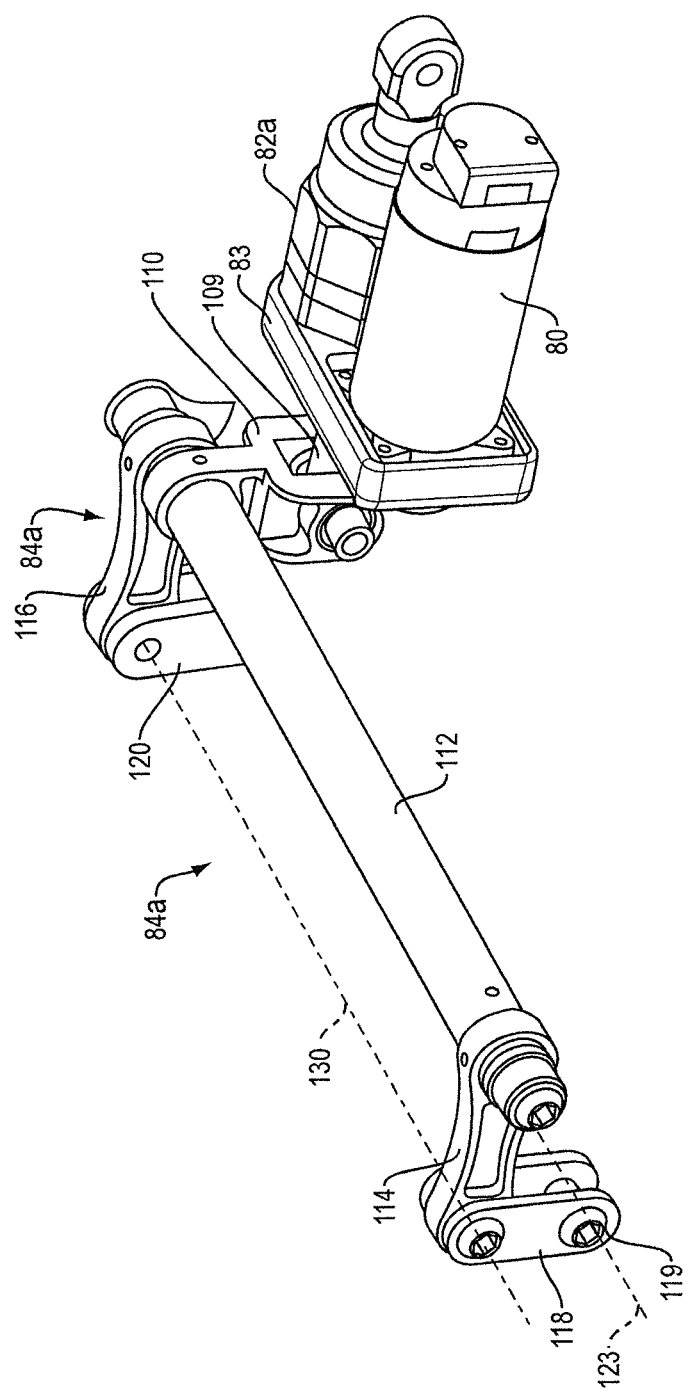
FIG. 7 is a detailed view of one actuator of the active suspension system of FIG. 4.
Figure 12:
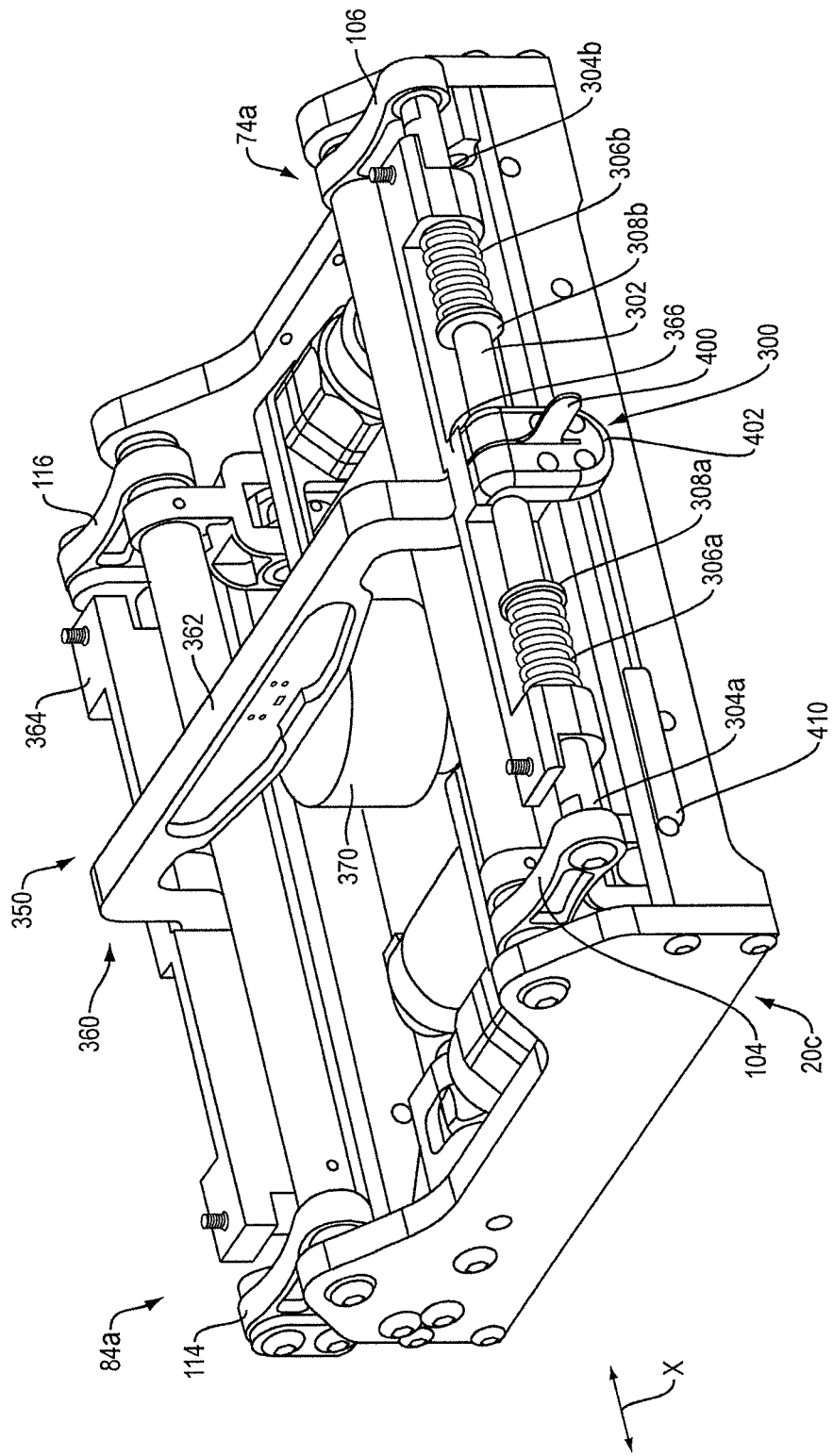
FIG. 12 is a top perspective view of another example of an active suspension system for the active vibration isolation system.

FIG. 12 is a perspective view of another example of active suspension system 20c. System 20c differs from active suspension system 20b, FIG. 4, in that active suspension system 20c includes a passive isolation stage 300. In some implementations, when the disturbances in the Z and roll directions are mitigated, the most significant remaining component of disturbance is in the fore-aft or X-direction. The passive isolation stage 300 included in the system 20c serves to mitigate these fore-aft vibrations. The seat S (FIG. 10) mounted to the active suspension system 20c may move along the fore-aft direction as described below. Each side of the passive isolation stage 300 (only a single side is visible in FIG. 12) includes a shaft 302, mounted between the links 104, 106 of rocker arm 74a and between the links 114 and 116 of rocker arm 84a (FIGS. 4 and 6).

Two linear sleeve bushings 304a, 304b are disposed along the shaft 302 and enable the isolation stage 300 (and the seat S connected thereto) to move along the axis of the shaft 302 in the fore-aft direction. Springs 306a, 306b are mounted between the cross members 364, 366 of the rigid mechanical seat support 360 (described in more detail with respect FIG. 13 below) and spring fasteners 308a, 308b affixed to the shaft 302. Springs 306a and 306b provides restorative force to bias the seat S toward the center of the range of travel in the fore-act direction when not being disturbed. When the vehicle undergoes fore-aft motions, the linear sleeve bushings 304a and 304b and the springs 306a and 306b absorb the relative motion and allow the seat S to remain largely stationary while the vehicle oscillates fore-aft.

Figure 13:
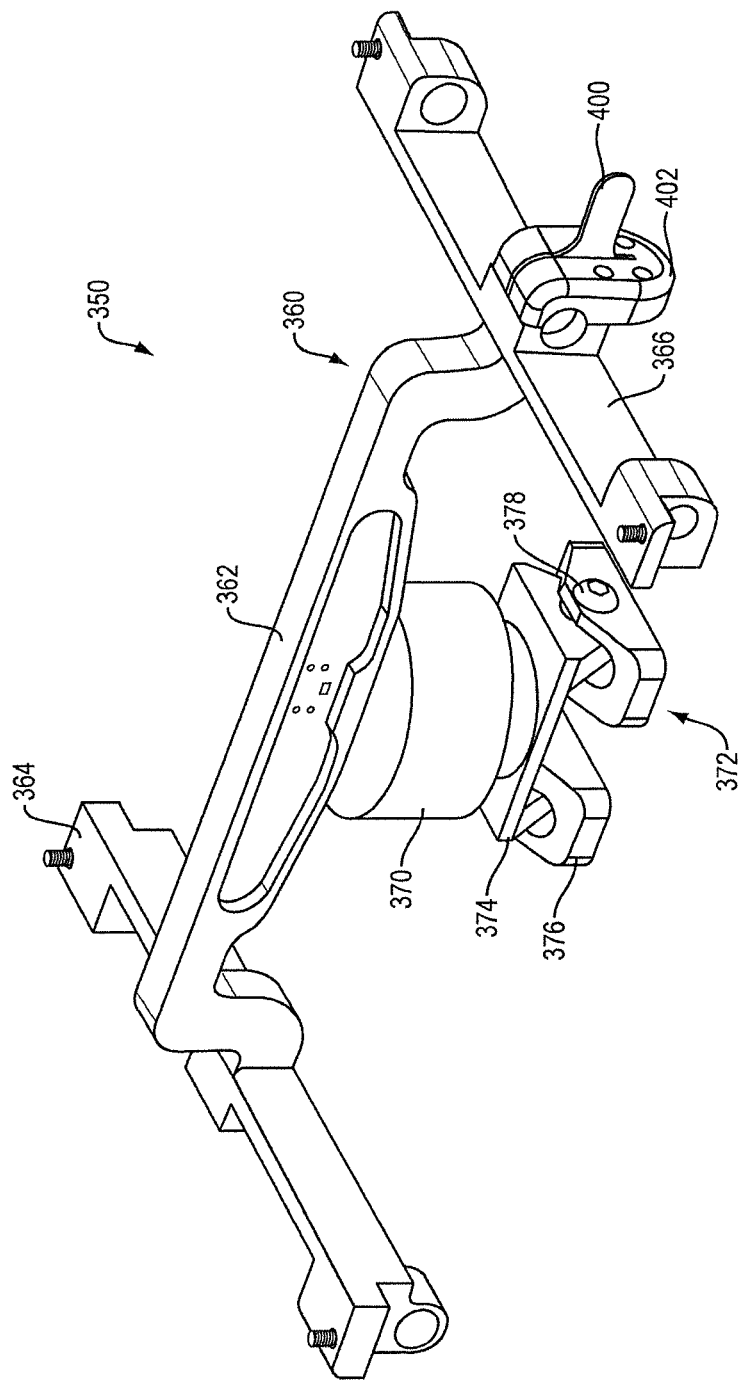
FIG. 13 is a top perspective view of a seat support/air spring assembly for the active suspension system of FIG. 12.

FIG. 13 is a top perspective view of a seat support/air spring assembly 350 for the active suspension system of FIG. 12. The support/air spring assembly 350 is comparable to the seat support air spring assembly 150 (FIGS. 8, 9) with differences to be described below. The assembly 350 is shown mounted to the active suspension system 20c in FIG. 12, and shown by itself in FIG. 13. Assembly 350 includes the rigid mechanical seat support 360 that itself comprises central member 362 and seat supporting cross members 364 and 366. Air spring 370 is coupled to the bottom of member 362 and is supported on the vehicle floor (not shown) by pivot assembly 372 to allow the connected end of the air spring 370 to rotate about transverse axis 378 as the assembly 350 (and connected seat S) moves in the fore-aft direction. The pivot assembly 372 includes an upper portion 374 connected to the air spring 370 and a lower portion 376 supported by the vehicle floor (not shown) which allows rotational motion about the axis 378, which extends orthogonally to the fore-aft or X-direction. The air spring 370 is thereby supported by and rotatably connected to the vehicle floor, as the assembly 350 (and connected seat S) moves in the fore-aft direction.

In some examples, a lockout blade 400 within a lockout blade assembly 402 is attached to one or both seat supporting cross members 364 and 366. When the user moves the lockout blade 400 to a first position, the lockout blade assembly 402 locks the isolation stage 300 in a position along the shaft 302, thereby preventing fore-aft movement of the seat S relative to the active suspension system 20c. In some examples, the lockout blade 400 engages one of a plurality of corresponding slots (not shown) located along the shaft 302, which are sized and configured to receive the lockout 400 while in the first position. When the lockout blade 400 is moved to a second position, the blade disengages the corresponding slot in the shaft 302 and permits the isolation stage 300 to move in the fore-aft direction. In some examples, the lockout blade 400 is biased within the lockout blade assembly 402, by a spring or other means, toward the first and locked position. When the blade 400 is moved to the second and unlocked position the user must overcome the bias of the lockout blade assembly 402 toward the first and locked position. In some examples, the blade assembly 402 includes a detent to control and regulate the movement of the lockout blade 400.

With renewed reference to FIG. 12, and in some examples, a damper assembly 410 can be included as part of isolation stage 300 which allows the seat top to move with respect to the vehicle—for example perhaps when going over a speed bump which decelerates and then accelerates the vehicle causing a fore-aft disturbance. The driver is isolated from this disturbance because the seat is allowed to maintain a more constant forward speed while the vehicle changes speed due to the bump (decelerating at first and then accelerating). In general, the isolation stage comprises a bearing system which secures the seat top to the mechanism but allows fore-aft motions. It also includes a set of springs which provide a centering force to keep the seat centered nominally so that it is ready to absorb motion when a disturbance occurs. The damper assembly 410 provides a mechanism to remove energy and to prevent or inhibit excessive or oscillatory motions. Damping can be accomplished with a hydraulic damper, or in other ways as would be apparent to one skilled in the field.

Without a damper, the seat could oscillate for multiple cycles after a disturbance. The damper removes the energy and causes the motion to decay away more rapidly (i.e., return to center of travel smoothly without excessive overshoot or with unwanted oscillations). One end of the damper assembly is coupled to the seat. The other end is coupled to something "stationary"—i.e., on the vehicle side of system—something which doesn't move fore-aft with the seat as the seat moves relative to the vehicle.

A number of implementations have been described. Nevertheless, it will be understood that additional modifications may be made without departing from the scope of the inventive concepts described herein, and, accordingly, other embodiments are within the scope of the following claims.

What is claimed is:

1. An active vibration isolation system for a seat for a motor vehicle, the seat being adapted to be occupied by a user, the active vibration isolation system comprising:
    an active suspension system that supports the seat above a floor of the motor vehicle, wherein the active suspension system comprises at least one actuator configured to be controlled to move the seat;
    a first sensor system that is adapted to determine a translational position of the seat;
    a second sensor system, including a neutral position sensor, that is configured to determine a neutral position of the seat; and
    a controller that, in response to input from the first sensor system, is adapted to provide a control signal to the active suspension system that causes motion of the seat that is designed to control a height of the user's head or torso as the motor vehicle undergoes translation, and wherein the controller is configured to re-calibrate the first sensor system, in at least one operating condition, based on input from the second sensor system as the seat moves through the neutral position.

2. The active vibration isolation system of claim 1, wherein:
    the active suspension system comprises at least two actuators, where the actuators can be controlled to move the seat in heave and roll,
    wherein the first sensor system is further adapted to determine a roll position of the seat, and
    wherein the controller is configured to control a lateral position of the user's head or torso as the vehicle undergoes roll and heave.

3. The active vibration isolation system of claim 2, wherein the second sensor system has an output state and is adapted to change the output state at a mid-height position of the seat relative to a vertical axis.

4. The active vibration isolation system of claim 3, wherein the second sensor system is configured to indicate whether the seat is above or below the mid-height position.

5. The active vibration isolation system of claim 2, wherein the control signal is adapted to maintain the lateral position of the user's head or torso as the vehicle undergoes rotation about a horizontal axis and translation along a vertical axis.

6. The active vibration isolation system of claim 2, wherein the actuators comprise a rotary motor and a linear actuator coupled to the rotary motor that converts the rotary motor motion to linear motion.

7. The active vibration isolation system of claim 6, wherein the linear actuator comprises a ball screw assembly.

8. The active vibration isolation system of claim 1, wherein the first sensor system comprises a relative sensor and the second sensor system comprises a one-bit sensor.

9. The active vibration isolation system of claim 1, wherein a third sensor system is mounted to the vehicle floor.

10. The active vibration isolation system of claim 9, wherein the third sensor system comprises a vertical axis accelerometer and a roll sensor.

11. An active vibration isolation system for a seat for a motor vehicle, the seat being adapted to be occupied by a user, the active vibration isolation system comprising:
    an active suspension system that supports the seat above a floor of the motor vehicle, where the active suspension system comprises a linear actuator that is configured to move the seat in roll and heave;
    a first sensor system that is adapted to determine a roll position of the seat;
    a second sensor system that is adapted to determine a neutral position of the seat; and
    a controller that, in response to the first sensor system, is adapted to provide a control signal to the active suspension system that causes motion of the seat that is designed to control a lateral position of the user's head or torso as the motor vehicle undergoes rotation about an axis, and wherein the controller is configured to re-calibrate the first sensor system, in at least one operating condition, based on input from the second sensor system as the seat moves through the neutral position.

12. The active vibration isolation system of claim 11, wherein the second sensor system has an output state and is adapted to change the output state at a horizontal mid position of the seat relative to a horizontal axis.

13. The active vibration isolation system of claim 12, wherein the second sensor system is configured to indicate whether the seat is to the left or right of a roll position of the seat.

14. The active vibration isolation system of claim 12, wherein a third sensor system is mounted to the vehicle floor.

15. The active vibration isolation system of claim 12, wherein the linear actuator comprises a rotary motor and an actuator coupled to the motor that converts the rotary motor motion to linear motion.

16. The active vibration isolation system of claim 15, wherein the actuator comprises a ball screw assembly.

17. An active vibration isolation system for a seat for a motor vehicle, the seat being adapted to be occupied by a user, the active vibration isolation system comprising:
    an active suspension system that supports the seat above a floor of the motor vehicle, where the active suspension system comprises at least two linear actuators that are configured to move the seat in heave and roll;
    a first sensor system that is adapted to determine a roll position of the seat and a seat translational position;
    a second sensor system that is adapted to determine a neutral position of the seat; and
    a controller that, in response to the first sensor system, is adapted to provide a control signal to the active suspension system that causes motion of the seat that is designed to control a lateral position and a height of the user's head or torso as the vehicle undergoes rotations and translations, and wherein the controller is configured to re-calibrate the first sensor system, based on input from the second sensor system in at least one operating condition, as the seat moves through the at least one neutral position.

18. The active vibration isolation system of claim 17, wherein the second sensor system has an output state and is adapted to change the output state at a horizontal mid-position of the seat relative to a horizontal axis, and a mid-height position relative to a vertical axis.

19. The active vibration isolation system of claim 18, wherein the second sensor system indicates whether the seat is above or below the mid height position, and whether the seat is to the left or right of the seat horizontal mid position.

20. The active vibration isolation system of claim 17, wherein a third sensor system is mounted to the vehicle floor.

21. The active vibration isolation system of claim 17, wherein the linear actuators comprise a rotary motor and an actuator coupled to the motor that converts the rotary motor motion to linear motion.

22. An active vibration isolation system for a seat for a motor vehicle, the seat being adapted to be occupied by a user, the active vibration isolation system comprising:
- an active suspension system that supports the seat above a floor of the motor vehicle, where the active suspension system comprises at least two linear actuators that are configured to move the seat in heave and roll;
- a passive isolation stage positioned between the motor vehicle seat and the active suspension system, wherein the isolation stage is configured to permit relative motion of the seat in a direction parallel to an axis;
- a first sensor system that is adapted to determine a roll position of the seat and a seat translational position; and
- a second sensor system that is adapted to determine a neutral position of the seat; and
- a controller that, in response to the first sensor system, is adapted to provide a control signal to the active suspension system to maintain a lateral position and a height of the user's head or torso as the vehicle undergoes rotation and translation, and wherein the controller is configured to re-calibrate the first sensor system, based on input from the second sensor system, in at least one operating condition, as the seat moves through the neutral position.

23. The active vibration isolation system of claim 22, wherein the passive isolation stage comprises a damper assembly to provide a damping force to mitigate at least one of oscillatory movement of the seat in a horizontal direction and excessive movement of the seat in the horizontal direction.

24. The active vibration isolation system of claim 22, wherein the passive isolation stage comprises a locking assembly to lock the position of the seat in a horizontal direction.

* * * * *